United States Patent
Chen et al.

(10) Patent No.: US 9,207,356 B2
(45) Date of Patent: Dec. 8, 2015

(54) SYSTEM AND METHOD FOR ESTIMATING A RESERVOIR PARAMETER USING JOINT STOCHASTIC INVERSION OF MULTISOURCE GEOPHYSICAL DATA

(71) Applicant: Chevron U.S.A., Inc., San Ramon, CA (US)

(72) Inventors: Jinsong Chen, San Ramon, CA (US); Gary Michael Hoversten, Lafayette, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 261 days.

(21) Appl. No.: 13/953,240

(22) Filed: Jul. 29, 2013

(65) Prior Publication Data
US 2015/0032426 A1    Jan. 29, 2015

(51) Int. Cl.
*G06G 7/48* (2006.01)
*G01V 99/00* (2009.01)
*G06N 7/00* (2006.01)
*G01V 1/30* (2006.01)
*G01V 3/38* (2006.01)
*G01V 11/00* (2006.01)

(52) U.S. Cl.
CPC .............. *G01V 99/005* (2013.01); *G01V 1/306* (2013.01); *G01V 3/38* (2013.01); *G01V 11/00* (2013.01); *G06N 7/005* (2013.01); *G01V 2210/614* (2013.01); *G01V 2210/6163* (2013.01); *G01V 2210/6169* (2013.01); *G01V 2210/622* (2013.01); *G01V 2210/624* (2013.01); *G01V 2210/6242* (2013.01); *G01V 2210/6244* (2013.01)

(58) Field of Classification Search
CPC ............ G01V 1/28; G01V 1/34; G06T 15/00; E21B 44/00; E21B 41/00; E21B 7/00; E21B 41/0092; G06G 7/48; G06G 7/50
See application file for complete search history.

(56) References Cited

U.S. PATENT DOCUMENTS

| | | | |
|---|---|---|---|
| 8,548,784 B2 * | 10/2013 | Dai et al. | 703/10 |
| 2011/0295510 A1 * | 12/2011 | Gulati | 702/16 |
| 2012/0143578 A1 * | 6/2012 | Fournier | 703/10 |
| 2012/0147704 A1 * | 6/2012 | Xian et al. | 367/73 |
| 2012/0221306 A1 * | 8/2012 | Hurley et al. | 703/6 |
| 2014/0116776 A1 * | 5/2014 | Marx et al. | 175/24 |

OTHER PUBLICATIONS

Eidsvik et al., "Seismic reservoir prediction using Bayesian integration of rock physics and Markov random fields: A North Sea example", The Leading Edge, Mar. 2002.*

Fieguth, P. "Statistical Image Processing and Multidimensional Modeling", Springer Science+Business Media, LLC 2011.*

(Continued)

*Primary Examiner* — Kandasamy Thangavelu
(74) *Attorney, Agent, or Firm* — Pillsbury Winthrop Shaw Pittman, LLP

(57) ABSTRACT

A system and a method for estimating a reservoir parameter are provided. The method includes calculating a plurality of priors using a Markov random field, the plurality of priors comprising probability distributions of a plurality of litho-types; calculating posterior distributions based on the priors, the posterior distribution depending upon measured geophysical data, geophysical attributes and reservoir parameters; and determining at least a portion of litho-types in the plurality of litho-types that correlate most with the measured geophysical data.

21 Claims, 3 Drawing Sheets

(56) References Cited

OTHER PUBLICATIONS

Chen et al. "Joint stochastic inversion of geophysical data for reservoir parameter estimation", SEG International Exposition and Seventy-Third Annual Meeting, 2003.*

Mukerji et al., "Recent Advances in Rock Physics and Fluid Substitution", CSEG Recorder 2006.*

Bosch, Miguel, 1999, Lithologic tomography: From plural geophysical data to lithology estimation: Journal of Geophysical Research, 104, pp. 749-766.

Chen, J., and M. Hoversten, 2012, Joint inversion of marine seismic AVA and CSEM data using statistical rock-physics models and Markov random fields: Geophysics, 77, R65-R80.

Chen, J., A. Kemna, and S. Hubbard, 2008, A comparison between Gauss-Newton and Markov chain Monte Carlo based methods for inverting spectral induced polarization data for Cole-Cole parameters: Geophysics, 73, F247-F259.

Clifford, P., 1990, Markov random fields in statistics, in Grimmett, G.R.; Welsh, D.J.A., Disorder in Physical Systems: A Volume in Honour of John M. Hammersley, Oxford University Press, pp. 19-32.

Eide, A. L., H. Omre, and B. Ursin, 2002, Prediction of reservoir variables based on seismic data and well observations: Journal of the American Statistical Association, 97, No. 457, pp. 18-28.

Feng, D., L. Tieney, and V. Magnotta, 2012, MRI tissue classification using high-resolution Bayesian Hidden Markov normal mixture models: Journal of the American Statistical Association, 107, No. 497, pp. 102-119.

Feng, D., 2008, Bayesian hidden Markov normal mixture models with application to MRI tissue classification: PhD Thesis, University of Iowa, 106.

Higdon, D. M., 1998, Auxiliary variable methods for Markov chain Monte Carlo with applications: Journal of the American Statistical Association, 93, pp. 585-595.

Mosegaard, K. and A. Tarantola, 1995, Monte Carlo sampling of solutions to inverse problems: Journal of Geophysical Research, 100, 12431-47.

Newman, G. A., and D. L. Alumbaugh, 2000, Three-dimensional magnetotelluric inversion using non-linear conjugate gradients: Geophysical Journal International, 140, pp. 410-424.

Potts, R. B., 1952, Some generalized order-disorder transformations: Proceedings of the Cambridge Philosophic Society, vol. 48, Issue 1, pp. 106-109.

Pratt, G., C. Shin, and G. J. Hicks, 1998, Gauss-Newton and full Newton methods in frequency-space waveform inversion: Geophysical Journal International, 133, pp. 341-362.

Roy, I. G., 2002, A robust descent type algorithm for geophysical inversion through adaptive regularization: Applied Mathematical Modeling, 26, pp. 619-634.

Swendsen, R. H. and J. S. Wang, 1987, Non-universal critical dynamics in Monte Carlo simulations: Physical Review Letter, 58, pp. 86-88.

Tarantola, A., 2005, Inverse problem theory and methods for model parameter estimation: SIAM, Philadelphia.

Wikle, C. K., 2003, Hierarchical Bayesian models for predicting the spread of ecological processes: Ecology, 84, pp. 1382-1394.

Wolf, U., 1989, Collective Monte Carlo updating for spin systems: Phys. Rev. Lett., 62, No. 4, pp. 361-364.

* cited by examiner

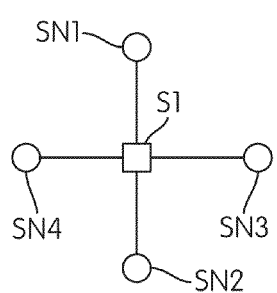
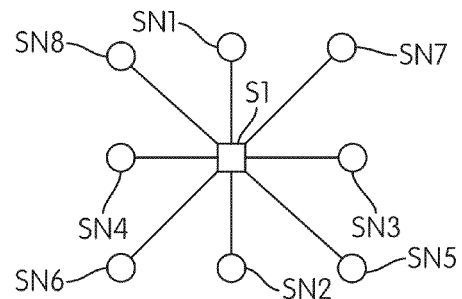
(a) 4 neighbors
FIG. 1A
(b) 8 neighbors
FIG. 1B
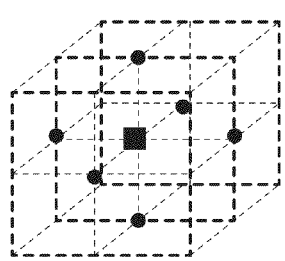
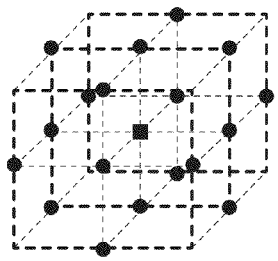
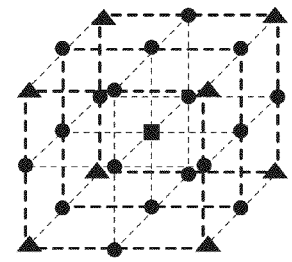
(a) 6 neighbors
FIG. 2A
(b) 18 neighbors
FIG. 2B
(c) 26 neighbors
FIG. 2C

SYSTEM AND METHOD FOR ESTIMATING A RESERVOIR PARAMETER USING JOINT STOCHASTIC INVERSION OF MULTISOURCE GEOPHYSICAL DATA

FIELD

The present invention pertains in general to computation methods and more particularly to a computer system and computer implemented method for estimating a reservoir parameter using joint stochastic inversion of multisource geophysical data.

BACKGROUND

Multiple sources of geophysical data have been used for estimating reservoir parameters for many decades. Current approaches for geophysical inverse problems are primarily deterministic inversion methods, such as Gauss-Newton methods, conjugate gradient methods, and steepest decent techniques. These conventional methods have been successfully used to solve a wide range of complex inverse problems with tens of millions of unknowns. However, the solutions obtained using these conventional methods often depend on the choice of initial values and thus are local rather than global. In addition, the deterministic inversion methods provide very limited uncertainty information on the estimated parameters.

Stochastic inversion methods have been recognized recently as a powerful approach for solving geophysical inverse problems. Stochastic methods have several benefits over deterministic inversion methods. For example, stochastic inversion methods can provide extensive information about unknown parameters. In addition, in stochastic inversion methods, the inversion results are almost independent of initial values and therefore global and robust.

SUMMARY

An aspect of the present invention is to provide a method for estimating a reservoir parameter, wherein the method is implemented in a computer system comprising one or more processors configured to execute one or more computer program modules. The method includes calculating, by the one or more processors, a plurality of priors using a Markov random field, the plurality of priors comprising probability distributions of a plurality of litho-types; calculating, by the one or more processors, posterior distributions based on the priors, the posterior distribution depending upon measured geophysical data, geophysical attributes and reservoir parameters; and determining, by the one or more processors, at least a portion of litho-types in the plurality of litho-types that correlate most with the measured geophysical data.

Another aspect of the present invention is to provide a system for estimating a reservoir parameter. The system includes one or more processors configured to: (a) calculate a plurality of priors using a Markov random field, the plurality of priors comprising probability distributions of a plurality of litho-types; (b) calculate posterior distributions based on the priors, the posterior distribution depending upon measured geophysical data, geophysical attributes and reservoir parameters; and (c) determine at least a portion of litho-types in the plurality of litho-types that correlate most with the measured geophysical data.

Although the various steps of the method according to one embodiment of the invention are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1A depicts a configuration of a first-order Markov random field on a two-dimensional (2D) inversion domain, where a given site S1 has 4 neighboring sites SN1, SN2, SN3 and SN4, located north of S1, south of S1, east of S1 and west of S1, respectively;

FIG. 1B depicts a configuration of a second-order Markov random field on a 2D inversion domain, where a given site S1 has 8 neighboring sites SN1, SN2, SN3 and SN4, SN5, SN6, SN7 and SN8 located north of S1, south of S1, east of S1, west of S1, south-east of S1, south-west of S1, north-east of S1 and north-west of S1, respectively;

FIG. 2A depicts a configuration of a site on a three-dimensional (3D) inversion domain having 6 neighboring sites;

FIG. 2B depicts a configuration of a site on a 3D inversion domain having 18 neighboring sites;

FIG. 2C depicts a configuration of a site on a 3D inversion domain having 26 neighboring sites;

DETAILED DESCRIPTION

Figure 3A:
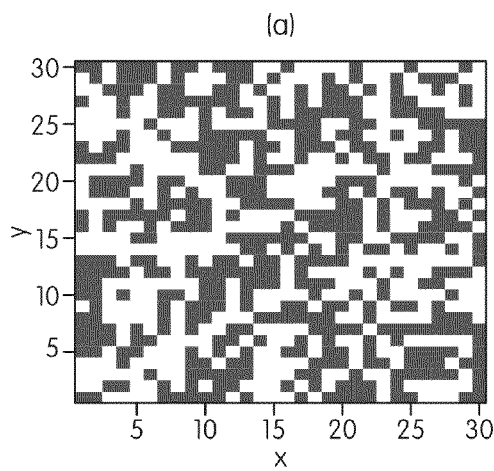
FIG. 3A depicts a first example of a possible two-dimensional pictogram of a prior information $f(L)$ with two litho-types and no spatial correlation, according to an embodiment of the present invention.

According to an embodiment of the present invention, there is provided a stochastic method based on the Bayesian framework to jointly invert 2D or 3D multiple types of geophysical data.

In one embodiment, categorical (or state) variables are introduced into the inversion. The categorical variables may have geological meaning, such as lithotypes or facies such as shale, sand, oil sand. The categorical variables may also be pure data-driven clusters, for example, clusters from classification of borehole data.

In one embodiment, 2D or 3D Markov random fields can be used to describe the spatial dependence of the state variables. It is assumed that rock-physics models are state-dependent probability distributions, either through statistical regression of borehole logs or mechanistic experimental analysis.

A hierarchical Bayesian model can be used to integrate multiple sources of geophysical data. Given vectors $d_1$, $d_2$, ..., $d_n$ representing n different types of geophysical data, such as seismic amplitude-versus-angle (AVA) data, controlled source electromagnetic (CSEM) data, etc., the geophysical attribute vector $x_G$ on 2D or 3D grids, such as seismic P-wave and S-wave velocities, density, electrical resistivity, and so on can be estimated. Furthermore, reservoir parameter vector $x_R$ on the same or different grids, such as porosity, fluid (i.e., water, oil, or gas) saturation can also be estimated. Other parameters associated with geophysical forward models, characteristics of measurement errors, rock-physics models, etc. can also be estimate.

$\theta_G$ and $\theta_R$ represent unknown parameters associated with geophysical attribute $x_G$ (e.g., seismic P-wave velocity and seismic S-wave velocity, density, electrical resistivity, etc.) and reservoir parameter $x_R$ (e.g., porosity, fluid saturation, etc.), respectively. These unknown parameters are not necessarily linked to grids.

Categorical (or state) variables, which are hidden states in this estimation, can be introduced. For example, these state variables may have geological meaning, such as variables litho-types or variables derived from clusters of borehole log parameters. In order to simplify the joint inversion, the state variables can be severed as auxiliary variables. The state variables can be represented by vector L.

Within the Bayesian framework, a hierarchical model can be provided. The model can be expressed using the following equation (1).

$$f(x_G, x_R, \theta_G, \theta_R, L | d_1, d_2, \ldots, d_n) \propto f(d_1, d_2, \ldots, d_n | x_G, \theta_G) \times f(x_G | x_R, \theta_R, L) \times f(x_R, \theta_R | L) \times f(L) \times f(\theta_G) \times f(\theta_R) \quad (1)$$

Equation (1) defines a joint posterior probability distribution function of all unknown parameters. The term $f(d_1, d_2, \ldots, d_n | x_G, \theta_G)$ in equation (1) is referred to as the likelihood function of geophysical data, which provides a link between the unknown parameters $x_G$ representing the geophysical attribute vector such as seismic velocity or velocities, density, electrical resistivity, etc.), $\theta_G$ representing associated coefficients that relate the geophysical attribute $x_G$ to some model functions or numerical simulations, and/or the geophysical data $d_1, d_2, \ldots, d_n$. As it can be appreciated, the likelihood function is a multi-parameter or multi-variable function that depends on a number of parameters or variables. The likelihood function expresses the probability that the numerical simulation or function (e.g., regression) of a given set of unknown coefficient $\theta_G$ and the unknown parameters $x_G$ fits the geophysical data $d_1, d_2, \ldots, d_n$. For example, if the numerical simulation or function fits the data well, the likelihood function should provide a relatively very large value. However, the likelihood function $f(d_1, d_2, \ldots, d_n | x_G, \theta_G)$ depends on the characteristics of its corresponding measurement errors. That is, the likelihood function depends, among other things, on the errors in the determination of parameter $\theta_G$ and in choosing a particular forward model when performing the simulation or regression. For example, multivariate Gaussian distribution is commonly used as a likelihood function of measurement data. However, if data have many outliers, a multivariate t-distribution can be selected instead in order to better accommodate the long tail in the distribution.

The term $f(x_G | x_R, \theta_R, L)$ in equation (1) represents the state-dependent rock-physics models, which can be mechanistically meaningful clusters or pure data-driven clusters. This term often is described by a mixing Gaussian model. This term is referred to as a reservoir dependent likelihood function and provides the relationship between a reservoir parameter $x_R$ (e.g., such as porosity, fluid saturation, etc.) and geophysical parameter $x_G$ (e.g., seismic velocity, density, electrical resistivity, etc.). However, this relationship also depends on the litho-type or facies L. That is, for each facies or litho-type $(L_1, L_2, L_3, \ldots, L_n)$, a relationship exists between the reservoir parameter $x_R$ and geophysical parameter $x_G$. $L_1, L_2, L_3, \ldots L_n$ represent different litho-types such as sand, shale, oil-sand, etc. The term $f(x_G | x_R, \theta_R, L)$ in equation (1) is unknown and may need to be estimated.

The term $f(x_R, \theta_R | L)$ in equation (1) represents state-dependent rock-physics properties at a given site. This term provides the relationship between reservoir parameter $x_R$ and litho-type L. That is, given a certain litho-type L (e.g., sand, shale, etc.), the probability of having a certain reservoir parameter $x_R$ (e.g., a certain reservoir porosity) may need to be estimated.

The term $f(L)$ is the joint distribution of the introduced state variable and represents the prior information. This term represents the probability of having a certain lithology or litho-type (e.g., sand, shale, etc.) at a certain location. This term is also unknown and may need to be estimated.

The terms $f(\theta_G)$ and $f(\theta_R)$ are prior distributions of hyperparameters, respectively, prior distributions of reservoir model coefficients $\theta_R$ and prior distributions of geophysical model coefficients $\theta_G$. These two terms may be treated as unknowns if the parameters $\theta_G$ and $\theta_R$ contain errors and are not obtained through the simulation or regression with the desired precision.

The term $f(x_G, x_R, \theta_G, \theta_R, L | d_1, d_2, \ldots, d_n)$ represents the posterior information which is a probability distribution obtained by multiplying all the above defined terms and represents the information that is the conditional probability distribution of the uncertainty given the geophysical data. The process of calculating the posterior is described in further detail in the following paragraphs.

The Bayesian framework provides a pragmatic way to combine multisource geophysical data for estimating unknown parameters as well as their associated uncertainty information. In one embodiment, Markov random fields (MRF) serve as prior models of the state variable L for 2D or 3D geophysical inversion. A Markov random field can be defined as follows.

In one embodiment, a finite index set (e.g., a set of sites, or locations or grids) S is provided. The finite index S contains one or more sites (locations or grids) s. Although grids are often used instead of sites or locations in geophysical inverse problems, the term 'site' is more generic because the term 'grid' often implies 2D or 3D regular grids but the term 'site' does not. Therefore, in the following paragraphs the term site will be used to include any location on a grid or otherwise. For each site in the index set S of sites ($s \in S$), there is provided a finite space K of states $1_s$, such as $K = \{1, 2, \ldots, k\}$, where k is the total number of states in this case.

In one embodiment, a neighbor $\partial(s)$ of a site s can be defined as follows. A collection $\partial = \{\partial(s): s \in S\}$ of sets is called the neighborhood system, if a site does not belong to the neighborhood collection system ($s \notin \partial(s)$) and $t \in \partial(s)$ if and only if $s \in \partial(t)$. The sites t that belong to the neighborhood collection (t∈∂(s)) are called neighbors of site s. Instead of writing the expression t∈∂(s), the expression s~t can also be written for convenience. In addition, a clique C can also be defined. A clique C is a subset of index set S if any two different elements of clique C are neighbors.

A random field π is a Markov random field with respect to the neighborhood system ∂(s), if for all states l belonging to finite space K (l∈K), the following equation (2) can be satisfied. Equation (2) is the definition of Markov random fields based on local characteristics.

$$\pi(L_s=l_s|L_t=l_p, t\neq s)=\pi(L_s=l_s|L_t=l_p, t\in\partial(s)) \quad (2)$$

The following equation (3) is the global definition of Markov random fields. The joint probability of state vector L is given by equation (3).

$$\pi(L)=\frac{\exp\{-H(L)\}}{\Sigma_{Z\in K}\exp\{-H(z)\}} \quad (3)$$

where H is called the energy function or Hamiltonian, and Σ exp {−H(z)} is the partition function or normalizing constant. The probability measure defined in equation (3) is the Gibbs fields or measure. The Gibbs field defined by equation (3) is equivalent to the Markov random field defined by the local characteristic defined by equation (2). The equivalence provides great convenience for developing sampling methods and allows focusing on local specification of neighbors.

Geophysical inverse problems often use regular grids, which may have a variable size. For example, for 2D problems, there may be two ways to define neighborhood systems. For example, in one instance, adjacent neighboring sites of a given site in a 2D grid can be selected as south, east, and west adjacent sites. This case is referred to as the first-order Markov random field. FIG. 1A depicts a configuration of a first-order Markov random field, where a given site S1 has 4 neighboring sites SN1, SN2, SN3 and SN4, located north of S1, south of S1, east of S1 and west of S1, respectively.

In another instance, adjacent neighboring sites of a given site in a 2D grid can be selected as south, east, west, south-east, south-west, northeast, north-west adjacent sites. This case is referred to as the second-order Markov random field. FIG. 1B depicts a configuration of a second-order Markov random field, where a given site S1 has 8 neighboring sites SN1, SN2, SN3 and SN4, SN5, SN6, SN7 and SN8 located north of S1, south of S1, east of S1, west of S1, south-east of S1, south-west of S1, north-east of S1 and north-west of S1, respectively.

Similarly, neighborhood systems for 3D grids can also be defined. FIG. 2A depicts a configuration of a site having 6 neighboring sites. The 6 neighboring sites include the same neighbors SN1, SN2, SN3 and SN4 shown in FIG. 1A and 2 additional neighbors that are located out of the plane containing the neighbors SN1, SN2, SN3 and SN4. FIG. 2B depicts a configuration of a site having 18 neighboring sites. The 18 neighboring sites include the same neighbors SN1, SN2, SN3, SN4, SN5, SN6, SN7 and SN8 shown in FIG. 1B and 10 additional neighbors that are located out of the plane containing the neighbors SN1, SN2, SN3, SN4, SN5, SN6, SN7 and SN8. FIG. 2C depicts a configuration of a site having 26 neighboring sites. The 26 neighboring sites include the same neighbors SN1, SN2, SN3, SN4, SN5, SN6, SN7 and SN8 shown in FIG. 1B and 18 additional neighbors that are located out of the plane containing the neighbors SN1, SN2, SN3, SN4, SN5, SN6, SN7 and SN8.

With a properly defined neighbor system, Potts models can be used to describe the spatial dependence of a site on its neighbor sites. This dependence is provided by the following equation (4).

$$\pi(L)\propto\exp\{\Sigma_{i\in S}a_i(l_i)\}\times\exp\{\Sigma_{i\sim j}\beta_{ij}I[l_i=l_j]\} \quad (4)$$

The term exp $\{\Sigma_{i\in S}a_i(l_i)\}$ represents the external fields or likelihood functions of available data. Three different methods can be used to draw samples of the state variables, which include Swendsen-Wang algorithms, Wolff algorithms, and Gibbs samplers.

FIG. 3A depicts a first example of a possible two-dimensional pictogram of the prior information f(L), with two lithotypes, according to an embodiment of the present invention. As stated above the prior information f(L) represents the probability of having a certain lithology or litho-type (e.g., sand, shale, etc.) at a certain location. The x-direction and y-direction in FIG. 3A represents the horizontal and vertical directions (e.g., east-west and north-south directions). The grey blocks represent a position of a first facies or litho-type, for example, shale, while the white blocks represent a position of a second facies or litho-type, for example, sand. As shown in FIG. 3A, there is no correlation between neighboring same litho-types and the first and second litho-types appear randomly dispersed in the x-direction and y-direction.

Figure 3B:
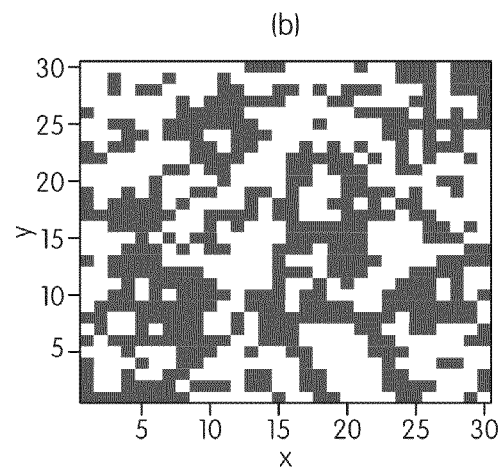
FIG. 3B depicts a second example of a possible two-dimensional pictogram of the prior information $f(L)$ with two litho-types and some spatial correlation, according to an embodiment of the present invention.

FIG. 3B depicts a second example of a possible two-dimensional pictogram of the prior information f(L), with two lithotypes, according to an embodiment of the present invention. The x-direction and y-direction in FIG. 3B represents the horizontal and vertical directions (e.g., east-west and north-south directions). The grey blocks represent a position of the first facies or litho-type, for example, shale, while the white blocks represent a position of the second facies or litho-type, for example, sand. As shown in FIG. 3B, there is some correlation between neighboring same litho-types and the first and second litho-types appear clustered or form clusters in the x-y space.

Figure 3C:
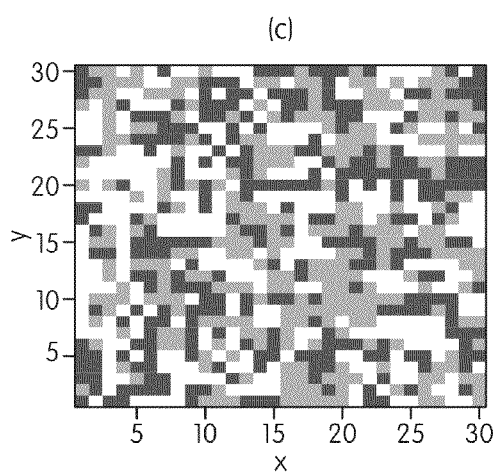
FIG. 3C depicts a third example of a possible two-dimensional pictogram of the prior information $f(L)$ with three lithotypes and no spatial correlation, according to an embodiment of the present invention.

FIG. 3C depicts a third example of a possible two-dimensional pictogram of the prior information f(L), with three litho-types, according to an embodiment of the present invention. The x-direction and y-direction in FIG. 3C represents the horizontal and vertical directions (e.g., east-west and north-south directions). The dark grey blocks represent a position of a first facies or litho-type, for example, shale, the white blocks represent a position of a second facies or litho-type, for example, sand, and the lighter grey blocks represent a position of a third facies or litho-type, for example, sand-oil. As shown in FIG. 3C, there is no correlation between neighboring same litho-types and the first, the second and third litho-types appear randomly dispersed in the x-direction and y-direction, similar to the example shown in FIG. 3A.

Figure 3D:
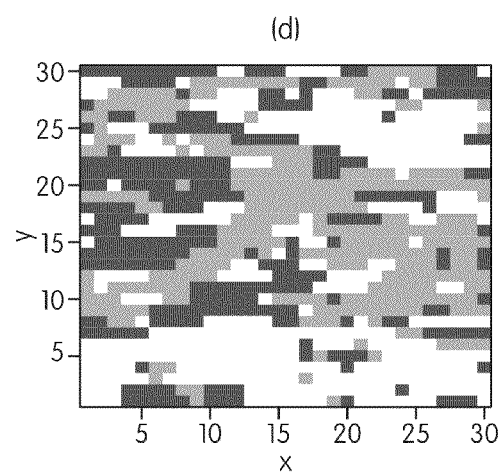
FIG. 3D depicts a fourth example of a possible two-dimensional pictogram of the prior information $f(L)$ with three lithotypes and some spatial correlation, according to another embodiment of the present invention.

FIG. 3D depicts a fourth example of a possible two-dimensional pictogram of the prior information f(L), with three lithotypes, according to an embodiment of the present invention. The x-direction and y-direction in FIG. 3D represents the horizontal and vertical directions (e.g., east-west and north-south directions). The dark grey blocks represent a position of a first facies or litho-type, for example, shale, the white blocks represent a position of a second facies or litho-type, for example, sand, and the lighter grey blocks represent a position of a third facies or litho-type, for example, sand-oil. As shown in FIG. 3D, it is apparent that there is some correlation between neighboring same litho-type. The first, the second and third litho-types appear clustered in the x-y space, similar to the example shown in FIG. 3B. In FIG. 3D, there is more spatial dependence of the distribution of the various litho-types. The spatial correlation in the x-direction is four times the spatial correlation in the y-direction. That is, there is a higher probability (e.g., four times) of two blocks of a same litho-type being connected in the x-direction than in the y-direction.

FIGS. 3A-3D represent only one realization or sample of the prior $f(L)$. There are a plurality (e.g., thousands) of such realizations or samples of the prior $f(L)$. For example, a plurality of realizations or samples similar to the one shown in FIG. 3A can be generated. These plurality of realizations or patterns are similar in nature in that the probability dependence in x and y directions is the same but having different distributions of the blocks representing the litho-types. In other words, for two realizations, the patterns obtained may be somewhat different but the probability dependence along the x-direction and the y-direction remains the same. This same analysis can be applied for the other realizations shown in FIGS. 3B, 3C and 3D.

The appropriate input of prior $f(L)$ into equation (1) can be selected depending upon an observation of the geology of an area of interest. For example, it may be determined from geological observations that there is more correlation in the x-direction than in the y-direction for the various litho-types in which case the model shown in FIG. 3B or FIG. 3D may be more appropriate in the calculation of the various unknown parameters in equation (1). By providing more information or data on the priors, the random field of the prior $f(L)$ can be narrowed in equation (1). As a result, the speed of calculation of the posterior information in equation (1) can be increased.

In the following paragraphs, a method is described for calculating the posterior information. In one embodiment, a hybrid method can be used to draw many samples from the joint probability distributions given in equation (1). The hybrid method includes several major steps. The first step is to assign initial values, which are arbitrary as long as they physically justified, to all the unknown parameters $x_G$, $x_R$, $\theta_G$, $\theta_R$, and L. The initial values are referred to as $x_G^{(0)}$, $x_R^{(0)}$, $\theta_G^{(0)}$, $\theta_R^{(0)}$ and $L^{(0)}$, respectively. Let t be an iteration index. For the initial values, it can be set to be 0, i.e., t=0.

In the second step, the hybrid method updates geophysical attributes by randomly selecting one of suitable sampling methods with a pre-set probability. In one embodiment, the sampling methods include Metropolis-Hastings, adaptive Metropolis-Hastings, or slice sampling methods. The samples are referred to as $x_G^{(t)}$.

In the third step, the hybrid method further updates hyper-parameters $\theta_G$ and $\theta_R$ by selecting a suitable sampling method among various Metropolis-Hastings or slice sampling methods. The samples are referred to as $\theta_G^{(t)}$ and $\theta_R^{(t)}$.

In the fourth step, the hybrid method further updates reservoir parameters using similar sampling methods. In one embodiment, the sampling methods may include Gibbs samplers if analytical conditional distributions are obtainable. The samples are referred to as $x_R^{(t)}$.

In the fifth step, the hybrid method updates state variables at all sites by randomly selecting one sampling method among the Swendsen-Wang algorithm, Wolf algorithms, or Gibbs samplers with a pre-set probability. The randomly selected litho-types are referred to as samples to as $L^{(t)}$. Examples of such samples or realizations are shown and described above with respect to FIGS. 3A-3D. In the particular examples shown in FIGS. 3A-3D, a Wolf algorithm is used to calculate and generate the probability distribution of the various litho-types in the x-direction and the y-direction.

The hybrid method includes repeating the above steps iteratively. The hybrid method includes determining whether a pre-set number of iteration is reached. If the number of pre-set iteration is not reached, repeating the above steps 2-5 through the loop until a number a pre-set total number of iterations is reached. If the number of pre-set iteration is reached, the method ends.

The pre-set probabilities for choosing sampling methods are tuning parameters. For example, in each step, we can pick Metropolis-Hastings with probability of 20% and slice sampling with probability of 80%. It is noted that the tuning parameters only affect the speed of convergence but not the results because when the sampling processes reaches the stationary stages of the joint posterior distribution, it does not matter how they get the stage by the properties of Markov chain Monte Carlo (MCMC) methods. Without prior information on the choice of tuning parameters, we typically set the tuning parameters being uniform in the preliminary stage and change them after gaining some experience through the preliminary runs.

We combine categorical based MCMC sampling methods with other MCMC sampling strategies for continuous variables to achieve the best sampling efficiency.

As it can be appreciated from the above paragraphs, one aspect of the present invention is to use prior information of unknown litho-types to determine a posterior probability by conditioning on a set of data (seismic data for example) to narrow down the field from a plurality of litho-type distributions to distributions that correlate more closely with measured geophysical data d. When the posterior information is determined the probability of having a certain litho-type at a certain position can be quantified.

As it can be appreciated from the above paragraphs, there is provided a method for estimating a reservoir parameter, wherein the method is implemented in a computer system comprising one or more processors configured to execute one or more computer program modules. The method includes calculating, by the one or more processors, a plurality of priors $f(L)$ using a Markov random field, the plurality of priors comprising probability distributions of a plurality of litho-types L; calculating, by the one or more processors, posterior distributions $f(x_G, x_R, \theta_G, \theta_R, L|d_1, d_2, \ldots, d_n)$ based on the priors $f(L)$, the posterior distribution $f(x_G, x_R, \theta_G, \theta_R, L|d_1, d_2, \ldots, d_n)$ depending upon measured geophysical data $d_1, d_2, \ldots, d_n$, geophysical attributes $x_G$ and reservoir parameters $x_R$; and determining, by the one or more processors, at least a portion of litho-types in the plurality of litho-types L that correlate most with the measured geophysical data $d_1, d_2, \ldots, d_n$.

In one embodiment, the method further includes calculating, by the one or more processors, a geophysical likelihood function of geophysical data $f(d_1, d_2, \ldots, d_n|x_G, \theta_G)$, the geophysical likelihood function providing a link between geophysical attributes $x_G$ and geophysical model coefficients $\theta_G$ and the geophysical data $d_1, d_2, \ldots, d_n$.

In one embodiment, the method further includes calculating, by the one or more processors, a reservoir dependent likelihood function $f(x_G|x_R, \theta_R, L)$, the reservoir dependent likelihood function $f(x_G|x_R, \theta_R, L)$ providing a link between a plurality of reservoir parameters $x_R$ and the plurality geophysical attributes $x_G$ for each of the plurality of litho-types L.

In one embodiment, the method further includes calculating, by the one or more processors, a state-dependent rock-physics term $f(x_R, \theta_R|L)$, the state-dependent rock physics term $f(x_R, \theta_R|L)$ providing a relationship between the plurality of reservoir parameters $x_R$ and the plurality of litho-types L and a reservoir model coefficients $\theta_R$.

In one embodiment, the method further includes calculating, by the one or more processors, prior distributions $f(\theta_R)$ of the reservoir model coefficients $\theta_R$ and prior distribution $f(\theta_G)$ of the geophysical model coefficients $\theta_G$.

In one embodiment, calculating, by the one or more processors, the posterior $f(x_G, x_R, \theta_G, \theta_R, L|d_1, d_2, \ldots, d_n)$ further comprises calculating the posterior based upon the geophysical likelihood function of geophysical data $f(d_1, d_2, \ldots, d_n|x_G, \theta_G)$, the reservoir dependent likelihood function $f(x_G|x_R, \theta_R, L)$, the state-dependent rock-physics term $f(x_R, \theta_R|L)$, the prior distributions $f(\theta_R)$ of the reservoir model coefficients $\theta_R$, and the prior distribution $f(\theta_G)$ of the geophysical model coefficients $\theta_G$.

In one embodiment, the method or methods described above can be implemented as a series of instructions which can be executed by a computer. As it can be appreciated, the term "computer" is used herein to encompass any type of computing system or device including a personal computer (e.g., a desktop computer, a laptop computer, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Various databases may be used. The databases may include or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 4:
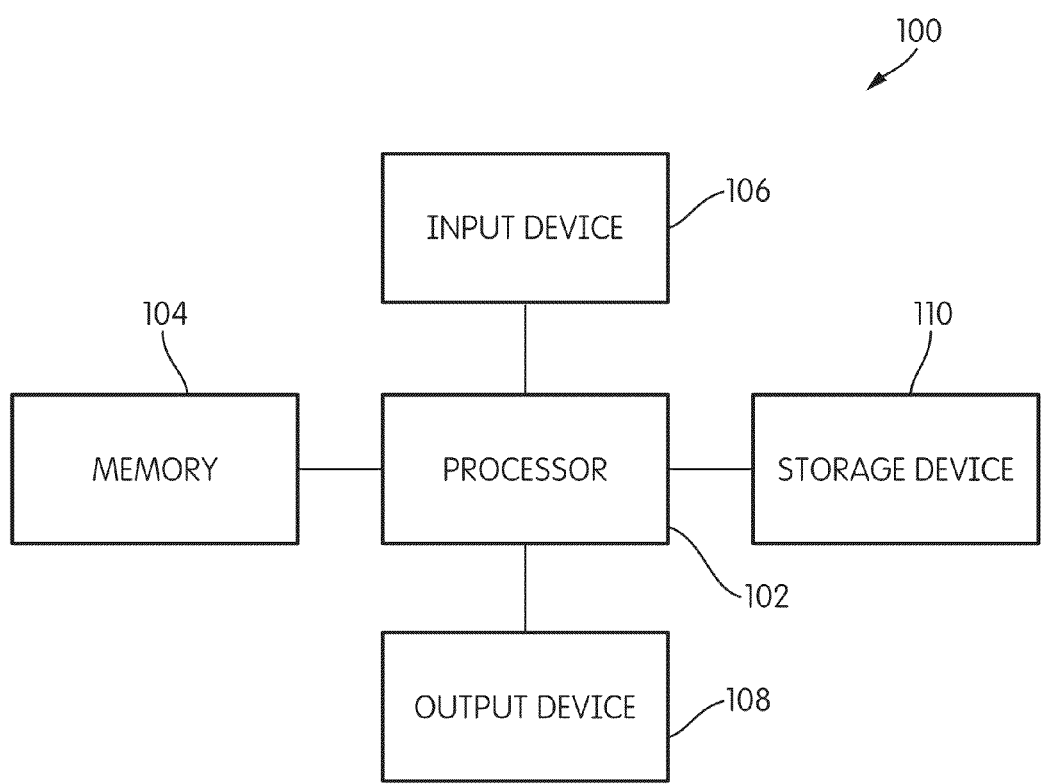
FIG. 4 is a schematic diagram representing a computer system for implementing the method, according to an embodiment of the present invention.

FIG. 4 is a schematic diagram representing a computer system 100 for implementing the method, according to an embodiment of the present invention. As shown in FIG. 4, computer system 100 comprises a processor (e.g., one or more processors) 102 and a memory 104 in communication with the processor 102. The computer system 100 may further include an input device 106 for inputting data (such as a keyboard, a mouse or the like) and an output device 108 such as a display device for displaying results of the computation. The computer system 100 may also include or be connected to a storage device 110. The storage device 110 can host a database or other data storage.

As can be appreciated from the above description, the computer system 100 includes one or more processors 102 configured to execute one or more computer program modules to: (a) calculate a plurality of priors using a Markov random field, the plurality of priors comprising probability distributions of a plurality of litho-types; (b) calculate posterior distributions based on the priors, the posterior distribution depending upon measured geophysical data, geophysical attributes and reservoir parameters; and (c) determine at least a portion of litho-types in the plurality of litho-types that correlate most with the measured geophysical data.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method for estimating a reservoir parameter, wherein the method is implemented in a computer system comprising one or more processors configured to execute one or more computer program modules, the method comprising:
    calculating, by the one or more processors, a plurality of priors using a Markov random field, the plurality of priors comprising probability distributions of a plurality of litho-types, each probability distribution providing a probability of having one litho-type in the plurality of litho-types at a certain spatial position;
    calculating, by the one or more processors, posterior distributions based on the priors, each posterior distribution depending upon measured geophysical data, a plurality of geophysical attributes and a plurality of reservoir parameters; and
    determining, by the one or more processors, based on the posterior distributions, at least a portion of litho-types in the plurality of litho-types that correlate most with the measured geophysical data.

2. The method according to claim 1, further comprising calculating, by the one or more processors, a geophysical likelihood function of geophysical data, the geophysical likelihood function providing a link between the plurality of geophysical attributes and a plurality of geophysical model coefficients and the measured geophysical data.

3. The method according to claim 2, further comprising calculating, by the one or more processors, a reservoir dependent likelihood function, the reservoir dependent likelihood function providing a link between the plurality of reservoir parameters and the plurality of geophysical attributes for each of the plurality of litho-types.

4. The method according to claim 3, further comprising calculating, by the one or more processors, a state-dependent rock-physics term, the state-dependent rock physics term providing a relationship between the plurality of reservoir parameters and the plurality of litho-types and a plurality of reservoir model coefficients.

5. The method according to claim 4, further comprising calculating, by the one or more processors, a prior distribution of the plurality of reservoir model coefficients and a prior distribution of the plurality of geophysical model coefficients.

6. The method according to claim 5, wherein the calculating, by the one or more processors, the posterior distributions further comprises calculating each posterior distribution based upon the geophysical likelihood function of the geophysical data, the reservoir dependent likelihood function, the state-dependent rock-physics term, the prior distribution of the plurality of reservoir model coefficients, and the prior distribution of the plurality of geophysical model coefficients.

7. The method according to claim 1, wherein calculating the plurality of priors using the Markov random field comprises calculating, by the one or more processors, the priors using a Gibbs field.

8. The method according to claim 1, wherein calculating the plurality of priors using the Markov random filed field comprises calculating, by the one or more processors, the priors using Swendsen-Wang algorithms, Wolff algorithms, or Gibbs samplers, the Swendsen-Wang algorithms, the Wolff algorithms or the Gibbs samplers being used to randomly select the plurality of litho-types.

9. The method according to claim 1, wherein the plurality of litho-types are selected from the group consisting of: sand, shale, and oil-sand.

10. The method according to claim 1, wherein the geophysical attributes comprise seismic velocity, density or electrical resistivity, or any combination thereof.

11. The method according to claim 1, wherein the reservoir parameters comprise porosity or fluid saturation or both.

12. The method according to claim 1, wherein the geophysical data comprises seismic amplitude-versus-angle (AVA) data or controlled source electromagnetic (CSEM) data, or both.

13. A system for estimating a reservoir parameter, the system comprising one or more processors configured to:
   calculate a plurality of priors using a Markov random field, the plurality of priors comprising probability distributions of a plurality of litho-types, each probability distribution providing a probability of having one litho-type in the plurality of litho-types at a certain spatial position;
   calculate posterior distributions based on the priors, the each posterior distribution depending upon measured geophysical data, a plurality of geophysical attributes and a plurality of reservoir parameters; and
   determine, based on the posterior distributions, at least a portion of litho-types in the plurality of litho-types that correlate most with the measured geophysical data.

14. The system according to claim 12, wherein the one or more processors are further configured to calculate a geophysical likelihood function of geophysical data, the geophysical likelihood function providing a link between the plurality of geophysical attributes and a plurality of geophysical model coefficients and the measured geophysical data.

15. The system according to claim 14, wherein the one or more processors are further configured to calculate a reservoir dependent likelihood function, the reservoir dependent likelihood function providing a link between the plurality of reservoir parameters and the plurality geophysical attributes for each of the plurality of litho-types.

16. The system according to claim 15, wherein the one or more processors are further configured to calculate a state-dependent rock-physics term, the state-dependent rock physics term providing a relationship between the plurality of reservoir parameters and the plurality of litho-types and a plurality of reservoir model coefficients.

17. The system according to claim 16, wherein the one or more processors are further configured to calculate a prior distribution of the plurality of reservoir model coefficients and a prior distribution of the plurality of geophysical model coefficients.

18. The method according to claim 17, wherein the one or more processors are further configured to calculate each posterior distribution based upon the geophysical likelihood function of the geophysical data, the reservoir dependent likelihood function, the state-dependent rock-physics term, the prior distribution of the plurality of reservoir model coefficients, and the prior distribution of the plurality of geophysical model coefficients.

19. The system according to claim 13, wherein the one or more processors are configured to calculate the plurality of priors using the Markov random field using a Gibbs field.

20. The system according to claim 13, wherein the one or more processors are configured to calculate the plurality of priors using the Markov random filed using Swendsen-Wang algorithms, Wolff algorithms, or Gibbs samplers, the Swendsen-Wang algorithms, the Wolff algorithms or the Gibbs samplers being used to randomly select the plurality of litho-types.

21. The system of claim 13, wherein the geophysical data comprises seismic amplitude-versus-angle (AVA) data or controlled source electromagnetic (CSEM) data, or both.

* * * * *